No. 790,626.                                                            Patented May 23, 1905.

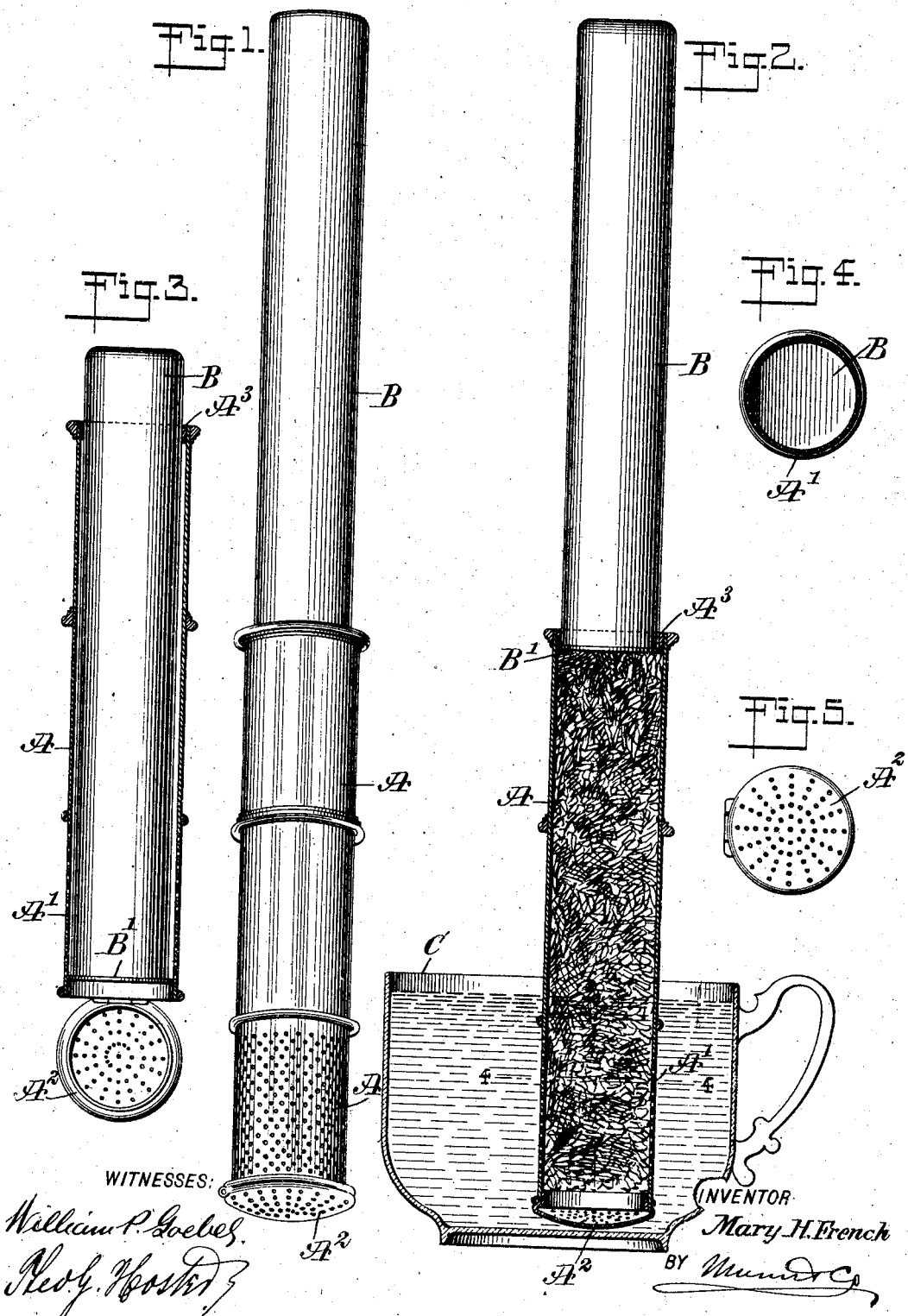

UNITED STATES PATENT OFFICE.

MARY HONORÉE FRENCH, OF NEW YORK, N. Y., ASSIGNOR TO WILLIAM S. VALENTINE, OF NEW YORK, N. Y.

INFUSION DEVICE.

SPECIFICATION forming part of Letters Patent No. 790,626, dated May 23, 1905.

Application filed November 16, 1904. Serial No. 232,965.

*To all whom it may concern:*

Be it known that I, MARY HONORÉE FRENCH, a citizen of the United States, and a resident of the city of New York, borough of Manhattan, in the county and State of New York, have invented a new and Improved Infusion Device, of which the following is a full, clear, and exact description.

The invention relates to tea-making devices; and its object is to provide a new and improved infusion device for making infusions of tea and like substances in a very simple and convenient manner and to a strength according to the desires of the person or persons for whom the infusion is intended, the device also serving for holding sugar and like substances used for sweetening beverages.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement, showing the plunger in an extended position. Fig. 2 is a sectional side elevation of the same, showing the device filled with tea-leaves and inserted in a cup of hot water. Fig. 3 is a like view of the improvement when not in use and showing the plunger telescoped and the cap open. Fig. 4 is an inverted sectional plan view of the improvement on the line 4 4 of Fig. 2, and Fig. 5 is a view of the cap end of the improvement.

The infusion device consists, essentially, of a tubular casing $A$, having one end $A'$ provided with perforations, and this end is adapted to be closed by a perforated cap $A^2$, preferably hinged to the casing and adapted to be held in a closed position by a suitable friction or other locking device. In the non-perforated upper portion of the casing $A$ is mounted to slide a plunger $B$, provided at its inner end with an annular flange $B'$, adapted to fit snugly against the inner wall of the casing $A$ and adapted to abut against a stop-ring $A^3$, secured to the upper end of the casing $A$, to limit the outward sliding motion of the plunger $B$ in the casing $A$.

In using the device the plunger $B$ is retracted a desired distance, according to the amount of the infusion to be made, and the tea-leaves or other substance then filled through the open cap $A^2$ into the casing, and then the cap is closed and the perforated end $A'$ of the casing is passed into the hot water or other infusion liquor contained in the cup $C$ or other vessel. When this is done, the infusion liquor readily passes through the perforations in the end $A'$ and the perforations of the cap $A^2$ to the inside of the casing $A$ and to the tea-leaves or other substance, so as to subject the latter to the action of the infusion liquor to form an infusion.

When the infusion has reached the desired strength, the device is lifted out of the cup $C$ and the infusion liquor still contained in the casing is allowed to drain out of the same.

By the arrangement described the device can be steeped successively in a desired number of cups filled with the liquor to be infused, thus enabling the user of the device to provide infusions of different strengths to suit the tastes of the intended users of the tea or other infusion.

In case the casing $A$ is completely filled with tea-leaves, for instance, and a number of cups of tea have been made in the manner above described—say, for instance, eight cups—then the operator opens the cap $A^2$ and pushes the plunger $B$ inward about half the length of the casing $A$, so as to discharge the lower half portion of the tea-leaves from the casing $A$, and then the cap is again closed and the device used further in the manner above described for making more cups of tea.

In filling the casing with tea-leaves it is desirable not to pack the tea-leaves too tightly, as the tea-leaves swell when the infusion liquor enters the casing.

By the arrangement described the tea-leaves are not liable to pass into the cup containing the infusion.

The device is very simple and durable in construction and can be cheaply manufactured, easily manipulated, and readily kept clean without much manual labor.

Having thus described my invention, I claim as new and desire to secure by Letters Patent—

1. A device for making infusions comprising a tubular casing for containing the substance to be infused and provided with a perforated end, a plunger movable in the casing and projecting at its outer end beyond the same, and a perforated cap hinged on the perforated end of the casing for opening or closing the perforated end.

2. A device for making infusions, comprising a tubular casing for containing the substance to be infused and provided with perforations in its side walls at one end, the said end being adapted to be inserted into the infusion liquor for the latter to pass through the perforations to the substance, to subject the latter to the action of the infusion liquor to form an infusion, a stop-ring secured to the upper end of the casing, and a plunger movable in the non-perforated portion of the casing, the body of the said plunger fitting snugly within the said stop-ring, the plunger being provided at its inner end with an annular flange adapted to fit against the inner wall of the casing, and to abut against the said stop-ring to limit the outward movement of the plunger.

3. A device for making infusions, comprising a tubular casing for containing the substance to be infused and provided with a perforated end adapted to be inserted into the infusion liquor for the latter to pass through the perforations to the substance, to subject the latter to the action of the infusion liquor to form an infusion, a plunger movable in the non-perforate portion of the casing, to increase or diminish the capacity of the casing, the said plunger being provided at its inner end with an annular flange adapted to fit against the inner wall of the casing, the outer end of the plunger extending beyond the casing to form a convenient handle for manipulating the casing and for pushing the plunger farther in or out in the casing, and a stop-ring secured to the upper end of the casing and against which the said flange is adapted to abut to limit the outward movement of the plunger in the said casing.

In testimony whereof I have signed my name to this specification in the presence of two subscribing witnesses.

MARY HONORÉE FRENCH.

Witnesses:
CLARA L. VALENTINE,
ELIZABETH B. FRENCH.